Patented July 17, 1951

2,560,830

UNITED STATES PATENT OFFICE 2,560,830

FEED FOR RUMINANT ANIMALS

Charles W. Turner, Columbia, Mo., assignor to American Dairies Incorporated, Kansas City, Mo., a corporation of Maryland, and The Quaker Oats Company, Chicago, Ill., a corporation of New Jersey No Drawing. Application October 22, 1945, Serial No. 623,854

7 Claims. (Cl. 99—2)

This invention relates to improvements in feeds for ruminant animals and refers more particularly to supplement constituents in animal feeds which increase the utilization of non-protein-nitrogen (amide nitrogen $NH_2$) compounds such as urea, ammonia or ammoniated compounds by ruminant animals and their conversion into organismal protein which can then be utilized by the digestive system of the host animal.

It is well-known that ruminant animals have the unique ability of utilizing non-protein-nitrogenous (N-P-N) compounds. This is accomplished by the symbiotic relation between micro-organisms which multiply in the rumen and reticulum of the ruminant animal which actually utilize the non-protein-nitrogen and convert it into organismal protein which can in turn be digested and absorbed by the host animal.

When roughage containing insufficient amounts of organismal growth promoting vitamins or bioses are fed with non-protein-nitrogen free of such factors and with grain or starch low in these same vitamins or bioses required for the growth of the rumen micro-flora and fauna, the utilization of non-protein-nitrogen is reduced because the growth or multiplication rate of the organisms converting N-P-N into organismal protein is reduced.

The present invention comprises methods of causing the retention in the rumen and reticulum of the non-protein-nitrogen and of the organismal growth factors and their slow solution into the liquid contents of the rumen so the process of utilization by the growing organisms can be long continued in the rumen instead of being swept into the abomasum and true digestive system where they can no longer be utilized.

Urea and most ammonia compounds are very soluble and as soon as they pass into the rumen they dissolve in the rumen fluid. Being soluble the urea, most ammonia compounds and amide nitrogen tend to pass out of the rumen into the abomasum leaving behind the roughage. Since the organisms require for their growth some sort of nitrogen, either non-protein-nitrogen or protein, which they can digest and break down into amino acids, the rapid disappearance of the soluble non-protein-nitrogen from the rumen reduce the growth rate of the rumen organisms during the latter part of the interval between feeding periods.

Under natural feeding conditions the source of nitrogen for the rumen micro-organisms is the protein in the roughage and protein concentrate portion of the grain mixture. The enzymes of the normal micro-flora have the ability to digest the protein gradually in both the concentrates and in the roughage and thus the micro-flora is provided with nitrogen throughout the normal period during which the feed remains in the rumen. There is thus ample time for the organisms to grow rapidly throughout the interval between periods of food intake. During this period, the organisms are able to digest much of the crude fiber (cellulose) present in the roughage thus making it available to the host animal. During the digestion of roughage and concentrate mixtures in which they are present the vitamins, bioses and other organismal growth factors are also released gradually so that these factors become slowly available to the organisms during the intervals between feedings.

In contrast to the gradual release of the organismal growth factors which occur when natural foodstuffs are digested in the rumen, the use of non-protein-nitrogen which is very soluble and the use of pure growth factors, vitamins and bioses, which would be readily soluble and of molasses and other forms of soluble carbohydrates introduces an important difference which, if not controlled, permits the rapid flow of these substances from the rumen with consequent marked reduction in the digestion of the cellulose and the lack of conversion of the non-protein-nitrogen into organismal protein.

This invention also relates to the inoculation or culture of and/or improvements in the stimulation of the rate of growth, reproduction and metabolism of micro-flora and fauna in the enlargement of the esophagus called the reticulum, rumen and omasum of ruminant animals by the addition to the ration of the host selected mixtures of the cultures of such micro-organisms and natural or synthetic growth stimulating substances, vitamins, bioses, amino acids, trace elements and salts, etc., required for the growth, reproduction and metabolism of the bacteria, yeast, and other types of micro-flora and of protozoa and other types of micro-fauna inhabiting the rumen.

The invention also contemplates the addition to the ration of ruminant animals of a mixture of the cultures of the rumen micro-flora and/or of other vitamins, bioses, growth stimulating substances, micro-nutrients, essential amino acid (or proteins), salts and minerals in minimal amount which will promote the growth, reproduction, multiplication and metabolism of the micro-organisms inhabiting the rumen and related parts of the fore stomach. The cultures of the rumen micro-flora and/or mixtures of growth stimulating substances mentioned may be administered in any one of a number of methods as follows: As a separate feed to the animal, as a part of the salt or mineral mixture, as a part of the individual or mixed grain or concentrate mixture, as an addition to urea, or other non-protein-nitrogen compound (amide) or by other methods known in the art of animal husbandry.

The amounts of the essential growth stimulating mixture contemplated in this invention have broad limits of tolerance. That is, amounts in excess of the minimum requirements will be of rapidly decreasing value but will not be harmful. General recommendations as to minimal amounts for various types and body weights of ruminant animals will be indicated. The total mixture administered separately or as a part of the grain or other feed fed to the ruminants or as a part of the salt or mineral supplement mixture should be such as to provide the daily intake specified in the examples hereinafter set forth.

The favorable nutritional effect upon the host (the ruminant animal) which may be obtained by augmenting the micro-flora of the paunch with cultures and by furnishing them with the mixture of vitamins and micro-organismal growth stimulating factors contemplated by this invention will now be described: The paunch of cattle and other ruminant animals consists of a large fermentation vat in front of the abomasum or true stomach. In this vat variable numbers of bacteria, yeast, protozoa and related micro-organisms grow, multiply and produce by-products of their metabolism. If these micro-organisms grow abundantly, they perform useful work in the digestion of some constituents of the diet otherwise unavailable to the animal, in the synthesis of protein from non-protein-nitrogen, and in the synthesis of vitamins of nutritive value to the host. These products are then absorbed through the lining of the rumen wall as such or pass into the abomasum and the other part of the digestive and absorptive system of the host (the ruminant) animal.

Ruminant animals normally consume roughages such as straw, hay and silage in considerable amounts. These plant materials contain from 40% to 60% of cellulose called crude fiber. Now the digestive juices of ruminant animals are incapable of digesting or converting cellulose into glucose sugar of which it is composed. It is, therefore, largely unavailable to many animals. However, through the mediation of the enzymes of the rumen micro-organisms various types of cellulose is first hydrolized by the enzyme cellulose to the disaccharide cellobiose, then cellobiose is hydrolysed to glucose by cellobiase. The extent to which cellulose is converted into glucose and thus becomes available to the host is dependent upon the number of micro-organisms present in the rumen capable of hydrolyzing cellulose. The stimulation of increased micro-organismal growth increases the digestibility of the cellulose to the host, thus increasing the digestion of otherwise indigestible feed constituents.

The animal with a normal stomach is incapable of using other than amino acids (or protein) in the growth of the animal body and for productive purposes requiring protein. Ruminant animals, because of the paunch, have the ability to use non-protein-nitrogen such as urea, ammonia, or other amids ($NH_2$ compounds). This is accomplished by the mediation of the rumen organisms which have the ability to use the non-protein-nitrogen compounds in the growth of their bodies. The organismal protein thus formed passes into the abomasum or true stomach of the host where it may be absorbed in its passage through the digestive and absorptive system. Thus cheap non-protein-nitrogen may take the place of expensive plant and animal protein in ruminant nutrition.

In a similar manner, the rumen micro-organisms have the ability of synthesizing many vitamins of the B-complex as products of their metabolism. Upon the digestion of the organisms upon passage into the true digestive system of the host these vitamins meet the requirements of the host for these factors and they may be secreted into the milk produced. In this way all the known B-vitamins are provided the host (the ruminant). Possibly many as yet unrecognized vitamin-like factors are provided the ruminant animals by their synthesis in the rumen.

In the rumen variable numbers of protozoa (one-celled simple animals) multiply. They develop and multiply in part upon the micro-flora of the rumen and in part upon the nutrient elements in the ration fed the host. Certain of these protozoa have the ability of digesting cellulose; the glucose thus produced being stored in the animal body as glycogen. The growth of these organisms thus provides for the conversion of plant protein fed the host into more valuable animal protein.

Now all good animal and dairy husbandmen recognize that when ruminant animals graze upon lush spring pasture, growth, reproduction, fattening, lactation, wool development and related productive processes are optimal. When the roughage is poor or the grain or concentrate mixture is poor in protein or non-protein-nitrogen is substituted for all or part of the high protein feeds, these productive processes are affected unfavorably. This is due in part to the reduced utilization of the crude fiber or cellulose, to reduced utilization of the non-protein-nitrogen and reduced production of the vitamins of the B-complex.

Now I have discovered that the cause of the poor utilization of crude fiber and non-protein-nitrogen, and reduced production of protozoan animal protein, and vitamins of the B-complex when poor, low quality roughage, non-protein-nitrogen and certain other concentrate feeds are fed as the sole diet of ruminant animals is due to the presence in insufficient number of the organisms normally inhabiting the rumen and/or of insufficient amounts of certain essential growth stimulating substances, amino acids or protein, bioses, vitamins, trace minerals, salt and mineral mixtures which are required by the various bacteria, yeast and protozoa normally growing in the rumen. When cultures of the micro-organisms and growth stimulating substances are supplied by methods to be described presently, then the growth, reproduction and metabolism of the bacteria, yeast and protozoa is greatly multiplied.

The cellulose of the ration (of which roughage contains 40–60%) which cannot be digested by the enzymes of the digestive tract, is digested by the enzyme action of the bacteria and protozoa to a greater degree. As the cellulose is thus broken down into glucose, it becomes a valuable addition to the available food supply of the host (the cow or other ruminant). By this means, roughages, straws, etc., considered by animal and dairy husbandmen to be relatively poor since the ruminant has been able to utilize only small amounts of the crude fiber (or cellulose), can be utilized to a greater extent by the practice of my invention.

A second economic advantage accruing from the practice of my invention is the marked increase in the amount of non-protein or amide nitrogen which may be fed to cattle and other ruminants when the cultures of the micro-organism and/or of their growth stimulating factors are supplied to the fermenting tank (the rumen). Since amide nitrogen cost only about one-sixth or less that of protein, the conversion of these simple nitrogen compounds into valuable plant and animal protein in increased amount reduces the cost of the feed required for growth, reproduction, fattening, wool growth or milk production.

A third advantage resulting from the practice of my invention is concerned with the greater production of vitamins of the B-complex resulting from the greater growth of micro-organisms. These vitamins which are required by the ruminant (the host) are synthesized by the micro-organisms in the rumen but become available to the host after passing down the true digestive system where the bodies of the bacteria, yeast and protozoa are broken down and the protein, fat, carbohydrates, minerals and vitamins contained are absorbed from the gut.

When the cultures of rumen organisms and/or proper growth factors for the micro-organisms are supplied to the rumen, the organisms grow more abundantly and synthesize larger amounts of the animal vitamins especially of the B-complex. These then become available in larger amounts to the host to stimulate body growth, fattening, wool growth, lactation and other productive processes.

While the role of rumen micro-organisms in the utilization of cellulose, and amide nitrogen has been recognized and the fact that the vitamins of the B-complex are thus synthesized, to our knowledge no one has heretofore suggested or demonstrated that by the addition of cultures of the micro-organisms and/or minimal amounts of the growth stimulating factors and vitamins for the microbiological flora and fauna of the ruminate paunch could these processes be improved and increased to the benefit of the host. In fact, since the rumen organisms were known to synthesize vitamins of the B-complex, it was generally taught that it was unnecessary to supply such factors to ruminate animals. It is true that the ruminant animals (the host) do not require the vitamins of the B-complex since they are available to them from the micro-organisms.

However, what had not hitherto been recognized was the requirement of the rumen organisms for various growth stimuli, bioses, vitamins, etc., which would most rapidly promote their growth and multiplication. The invention lies in the recognition of the fact that the primary requirement in the optimum nutrition of ruminant animals lies not primarily in the requirements of the host but rather resolves itself into the promotion of the growth and reproduction of the micro-organisms in the rumen. When the ration fed to ruminant animals is very low in the growth factors essential for the multiplication of the rumen-micro-organisms a vicious cycle is introduced into the rumen-fermentation system. With a reduction in the rate of micro-organismal growth, less cellulose is digested, less amide nitrogen can be converted to organismal protein and less vitamins are synthesized. By the addition of the organismal growth factors to the otherwise poor ration, i. e. roughages and grains low in the vitamins and growth factors, the organisms will again digest more cellulose, utilize more amide nitrogen and synthesize more vitamins for the benefit of the host.

The invention also makes provision for the culture of the micro-flora of the rumen to provide a continuing supply of the proper organisms to take advantage of the nutrients and conditions for their growth and multiplication in the rumen. The use of dry rumen contents or the in vitro cultivation provides both cultures of the rumen micro-organisms and some of the growth promoting factors.

GROWTH REQUIREMENTS OF RUMEN BACTERIA

Many types of bacteria normally inhabit the rumen of the various types of ruminant animals. Some of these have the ability of splitting cellulose, and starch and of utilizing simple sugars. Others digest protein and liberate peptides and amino acids. Some bacteria have very complicated requirements for the promotion of their growth whereas others can multiply on mineral elements including nitrogen plus a source of energy such as cellulose, starch or sugar. When the ration fed the host is low or devoid of the growth promoting substances required by some bacteria, the rate of multiplication of the organisms will be in proportion to the presence of the requirements of the various species. Thus the organisms with minimum growth requirements will continue to grow as usual, those with increased requirements will grow only so long as their essential growth factors are available and those with several or many requirements will not multiply at all. Minimal bacterial growth and multiplication will take place on cellulose, urea, and certain mineral elements or salts, but as the essential requirements of other strains of bacteria are provided, the growth of the total bacterial population will be augmented.

The requirements of bacteria follow: Thiamin, or its component parts pyrimidine and thiazole. Some bacteria require one or the other of the component parts while others require both or thiamin. By supplying thiamin all bacteria of this type will be able to grow. Choline, riboflavin, nicotinic acid and related compounds (amide, diethylamido, pyridoxine and related compounds, pantothenic acid and/or its components B-alanine and dihydroxyvaleric acid, biotin, folic acid and inositol, are required singly or in various combinations. In addition to those mentioned the natural vitamin-rich substances may contain other essential factors. Some bacteria are stimulated by two or more of the components of the B-complex others by three, etc. The more complete the diet, the more types of bacteria will grow abundantly.

In addition to the vitamins, certain amino acids are required for bacterial growth of some organisms whereas other bacteria will utilize non-protein-nitrogen (amide nitrogen).

Again, the more biologically complete protein which contain the essential amino acids will provide the requirement of the greatest number of types of bacteria and promote the greatest amount of bacterial growth.

THE RUMEN YEAST

The growth requirements of yeast are, in many respects, similar to those of bacteria. The individual vitamins of the B-complex have been shown to be required and certain amino acids. In addition lecithin and sterols may be helpful in some strains in increasing the rate of reproduction. As yet unrecognized bioses in liver also stimulate the multiplication of some strains of yeast. In order to approach the maximum growth rate of rumen yeast these various factors must be provided to the ruminant animal as indicated in Example 1.

THE RUMEN PROTOZOA

Since these one-celled animals feed in part upon the bacteria and yeast, their vitamin requirements are supplied by the vitamins contained in the bodies of the micro-flora. They are unable to utilize non-protein-nitrogen but certain types have the ability to utilize cellulose as a source of energy. Others digest starch and utilize sugar. The rapid reproduction of the various types of rumen protozoa is dependent upon the presence of large numbers of bacteria and yeast.

When ruminant animals are fed urea and other types of non-protein-nitrogen, containing soluble B-complex vitamins, bioses and other related nutrients such as molasses, soluble sugars, trace elements and other growth factors required for the growth and reproduction of rumen microflora and fauna, the instant method of retarding the rate of passage of the varied nutrients from the rumen was discovered.

The invention may be practiced in a variety of ways:

1. The urea particle may be coated with protein films of various types such as casein or soy bean protein glue. Thus it will be necessary for the film on the particle to be digested by the rumen organisms before the urea will dissolve into the aqueous contents of the rumen.

2. High melting-point fats, fatty acids, waxes, paraffin and other related compounds may be used individually or as mixtures of two or more of these compounds. The urea or other related sources of non-protein-nitrogen would be mixed with the above compounds. These fats or waxy materials would also tend to reduce the rate of solution of the urea or other non-protein-nitrogenous materials.

3. Cellulose and derivatives of cellulosic materials, such as methyl cellulose, may be mixed or sprayed over urea and related non-protein-nitrogenous compounds and dried to form films over the nitrogenous materials. As an alternative finely powdered cellulose, crude fiber or hay may be mixed with a suitable binder and then combined with urea and related non-protein-nitrogenous mixtures, then compressed. The presence of cellulose and related compounds in the mixture decreases the rate of solution of the urea in the rumen contents.

4. In place of the compounds mentioned many other compounds known to the art may be substituted. The essential criterion of usefulness of the particular compound being employed must be the reduction in the rate of solution of the soluble materials, urea or other non-protein-nitrogens with which they are mixed to form loose combinations, either coating or combining with the substance.

Thus, it will be seen that the invention contemplates the use of the above several enumerated methods to slow down the solution of urea or other related sources of non-protein-nitrogen or loose chemical compounds formed by action of the rumen fluids upon these substances.

The art of preparing enteric coatings as applied to drugs and chemicals is designed to cause the medication to be retained intact until it passes out of the stomach and into the small intestine. Thus, the coating must be resistant to acid conditions and dissolve in an alkaline solution. This principle applies only to animals with simple stomachs and is adapted primarily for the administration of medication.

In ruminant animals such methods and compositions as are used for enteric coatings are inapplicable. Pills eaten by ruminant animals would be regurgitated and chewed. Thus, the enteric coating would be broken and the medication would not reach the intestine intact.

The instant disclosure contemplates entirely new functions for coatings unrelated to methods of medication which function in a manner not previously contemplated by any type of coating used in the feeding of ruminant animals. This coating is designated for convenience as a "ruminal coating." It may be defined as a coating adapted to reduce the rate of solution of soluble constituents of the diet and one which will not promote their passage intact into the abomasum. Since regurgitation and rechewing of the feed occurs, the coatings must be applied to small particles as well as large so that chewing will not expose all the material to immediate solution. Coatings which are insoluble in water at rumen pH (6.0 to 7.5) but are dissolved by the enzymes of rumen micro-organisms will promote gradual solution. Since many coating materials will accomplish this purpose to variable degrees those enumerated are offered merely as operative examples to be selected at the will of the producer of the feed.

In practicing the invention it is desirable to compact the coated urea or other related sources of non-protein-nitrogen in the form of cubes, spheres, leaves, disks, rods, etc., with pressure and heat with any one or a mixture of a number of binders known to the art as concentrate feed cubing. Among the successful binders which have been used are preparations of casein or other types of protein, resins, glue, waxes, high melting-point fat, fatty acids, paraffins, etc. The cubes, spheres, disks, extruded rods and other types of compacted pellets may be produced in a variety of sizes for the different type animals. In addition it is contemplated that these compressed pellets be made in various sizes in order to delay the rate of solution of the soluble constituent of the ration in the process of rumination.

In other words, the fundamental concept of the invention is to chemically and mechanically impede the rate of passage into solution with the ruminant fluids of the artificial or substituted constituents which it is proposed to feed to ruminant animals in place of the natural foods. These include urea and non-protein-nitrogen constituents, micro-organismal growth stimulating substances such as vitamins of the B-complex, proteins and essential amino acids, mineral elements, fat and lipid constituents, and dry, normal or in vitro cultures of rumen micro-flora.

These constituents will be impeded from chemical solution with the fluids of the rumen by means of film coating of protein and related plastic compositions, high melting-point fats, fatty acids, waxes and other coatings of similar type known to the art. Solution will also be impeded by mechanical means such as the compacting into cubes, squares, sheets, rods, pills and pellets of various sizes and shapes which may be covered with protein or other coating or binder materials previously suggested. Since the larger sized cubes or pellets will be regurgitated and rechewed later, it is important that a proportion of the compacted material be of a size resembling grains of corn so they may escape rechewing and thus disintegrate slower.

Improvement in the palatability and the effect which this change of ration may have upon feed consumption is of course a vital factor. Chemical substances such as urea, ammonium salts, thiourea, thiouracil and any other chemicals which may be fed to ruminant animals for the purposes mentioned previously or for other purposes such as rapid fattening of ruminant animals are frequently rejected by the animals due to unfamiliar taste or smell. As a result the feed consumption is limited and the beneficial effects for which the chemical compound is administered may be reduced or entirely cancelled. By coating the chemical particles or aggregates by the methods described the consumption of the feed containing objectionable taste, odor or smell is retained at a normal level and palatability assured.

This practice of surrounding the substances having objectionable taste or smell with a film of protective coating, then compacting the coated particles into cubes, pills, rods or pellets with natural feeding materials and again coating the pellet mixtures improves the palatability and eliminates rejection of the substances by the animal.

Example I

Urea, ammonium salts and other non-protein-nitrogen sources (amide nitrogen) suitable for ruminant animal feeding which are relatively soluble in water or in the liquid part of the rumen contents are treated as follows:

The non-protein-nitrogen compounds of choice are ground into a meal to increase the surface area. The ground compounds are then mixed with casein, soy bean proteins or glue or other types of protein glue to cover each particle of the compound with a protein film. Egg whites, gelatin, and the like are other examples of proteins which may be used. The coated substances are then dried with agitaton or by spraying into a dry cabinet or hardened with formaldehyde, so that fairly large aggregations of the substances are produced, or fine particles.

The essential object is to coat each particle of the non-protein-nitrogen with a stable protein film which will require digestion by the bacteria and yeast enzymes or gradual solution before exposure to the dissolving action of the fluid contents of the rumen. By this coating method the urea or non-protein-nitrogenous substances will gradually become available to the rumen organisms as a building stone in the synthesis of organismal protein. Furthermore, the protein film, if of good quality protein, such as casein, soy bean protein and egg white will serve as a partial source of protein.

The second step in the process is the combination of the protein film coated non-protein-nitrogenous compound with a source of energy feed such as ground concentrate grains such as corn, oats, soy bean or other grain or starchy by-product feed as would be used in normal feeding with the type of roughage available. With low protein roughage more protein concentrates would be required; with high protein roughage no additional protein in the grain concentrate mixture would be necessary. To the above mix may be added bacterial and yeast growth stimulating substances already mentioned and other ingredients outlined previously.

These several substances may be fed individually or mixed together with a binder and compressed into pellet units. The pellets are then preferably coated with a protein film which further retards the rate of solution of the soluble ingredients contained therein.

Example II

Urea, ammonium salts and other sources of non-protein-nitrogenous compounds, as described in Example I, are coated with high melting-point fats, fatty acids, such as stearic acid, waxes, paraffins, and other related compounds and the remaining procedure followed as given in Example I.

Example III

Cellulose compounds or derivatives thereof are mixed with urea or other compounds which are the source of non-protein-nitrogen. The mixture is dried so a cellulose film covers the urea or amide compound. This product is then used according to the procedure outlined in Examples I and II.

Example IV

When rations for ruminant animals consist of roughage such as straw, corn stalks, timothy or other grass hays, silage, low quality leguminous hays (by low quality hay is meant hay which as a result of the method of curing has lost much of the B-complex vitamins it originally contained) plus simple grain or concentrate feed such as ground corn, ground oats, starch or other grain by-products low in vitamins of the B-complex, the productive process such as milk-production, growth and fattening and wool production are seriously depressed. It has been discovered that the productive value of such rations can be greatly improved by supplying rumen bacteria, yeast, and related rumen micro-flora with minimum amounts of substances, extracts, mixtures, either synthetic or natural containing bioses, vitamins, bacterial and yeast growth stimulating properties, essential amino acids or protein and essential minerals. The best known of these natural substances are alfalfa leaf meal or related leguminous plant products and extracts, dried cereal grasses or extracts therefrom, by-products of grain or legumes rich in water-soluble B-complex vitamins, or extracts therefrom, dried fermentation solubles, of distillers' or brewers' grains or extracts therefrom, brewers' and distillers' yeast, either natural, irradiated or extracts therefrom, dried liver or liver extracts and dried buttermilk or non-fat milk solids or extracts thereof. Other natural products or their extracts shown to be rich in any of the bacterial or yeast growth stimulating substances would be effective in relation to the concentration of their essential constituents.

In practice the bacterial and yeast growth stimulating substances would be composed of any one or a mixture of the following: Dried brewers' or distillers' yeast or mixtures of the two including irradiated yeast, dried torula yeast or other wild yeast, dried fermentation solubles of distillers' or brewers' grains or extracts therefrom, dried non-fat milk solids, dried buttermilk or their extracts, dried cereal grass and dried alfalfa leaf meal. The proportions used of the enumerated substances would depend upon their concentration to obtain a mixture containing the maximum amount of growth factors of their component parts. The principal growth factors concerned are thiamin, choline, riboflavin, nicotinic acid, pyridoxine, biotin, folic acid, inositol and other B-complex vitamins, bioses, and growth substances shown to have stimulating effects upon bacteria or yeast.

It is contemplated that to the natural products, mixtures, or extracts previously enumerated may be added supplementary amounts of synthetic vitamins and the growth factors indicated. The bacterial and yeast growth stimulating substances would be fed by any of the usual methods known to the art, including:

(a) As an addition to the concentrate feed,
(b) As a part of the salt mixture,
(c) As a part of the mineral mixture.

Since the natural products rich in bacterial and yeast growth stimulating substances vary considerably, exact upper limits for blending or proportioning these feeds to the ration can be indicated only within a rather broad range. The economic return from the improvement in the productive process of a given type animal will also dictate the upper limits of the amount to feed. From a trace to 5.0% of the total feed will usually cover the economic range. Physiologically and nutritionally larger proportions will not be harmful. This material may then be processed according to Example I if desired.

*Example V*

When rations for ruminant animals consist of roughages of variable quality a part or all of the protein may be replaced by urea, ammonium salts or compounds, amids or other related non-protein-nitrogenous compounds. In addition the ration may be low in various growth stimulating substances required by the rumen organisms. As a result the bacteria and yeast of the rumen fail to grow as rapidly as when furnished sufficient growth stimuli and, as a consequence, the non-protein-nitrogen is converted into organismal protein only in part, the cellulose in the roughage is likewise digested in reduced amounts and the synthesizing of B-complex vitamins in reduced. For these reasons the productive value of the rations as fed to various ruminant animals is often unsatisfactory.

When various bacterial and yeast growth stimulating substances or mixtures described in Example IV are added to non-protein-nitrogen and other concentrate feeds the productive effects of the rations is considerably improved. If synthetic vitamins and bioses, lacking in mianimal amounts of protein as compared to the natural products, are used, then casein, dried non-fat milk solids, dried buttermilk, whey proteins or other quality proteins are required to furnish the protein and amino acid requirement of the rumen organisms. If the diet is low in mineral elements, calcium, phosphorous and trace elements such as iron, copper, cobalt, manganese must be provided for micro-organismal growth.

*Example VI*

When ruminant animals are fed rations for a considerable period low in bacterial and yeast growth stimulating substances, some types of rumen micro-organisms disappear and others lose their vitality for normal growth. As a consequence, normal rumination may stop in extreme cases, the normal movements and passage of the roughage is interfered with because the roughage is not reduced sufficiently in particle size to pass into the omasum and abomasum, compaction of the rumen may result or in less severe cases, where the cellulose of the roughage is made available in less than normal amounts there is a shortage of carbohydrates available to the host animal. This shortage causes the animal to utilize reserve body fat resulting in ketosis or acetonemia, and depletion of the body weight.

It has been discovered that these conditions may be remedied in part by the methods described in Example IV. However, the depletion of the normal micro-organismal flora of the rumen interferes with recovery even in the presence of the growth stimulating factors. By the administration of fresh or dried rumen contents from well nourished animals simultaneously with the organismal growth stimulating substances described in Examples IV and V normal ruminal activity may be restored and maintained by methods described in Example IV.

To obtain suitable cultures of the micro-organisms normally inhabiting the rumen of well nourished animals two methods are used:

(a) The rumen contents of cattle, sheep, goats, and other ruminant animals obtained at packing plants are dried in toto at temperatures below the thermal death point of the rumen micro-organisms by methods known to the art or by the use of low temperatures and high vacuum drying methods. The rumen contents are most satisfactory when obtained from well fed animals and preferably within 12 hours of the last feeding period. The addition of organismal growth stimulating substances described in Example IV during the last few feedings preceding slaughter will aid in obtaining a luxuriant organismal flora in the rumen. If the rumen contents are full of coarse particles of roughage the coarse material may be separated from the more fluid portions by straining through cheesecloth or other fine mesh screen and the more fluid material centrifuged after which the bacterial and yeast solids are dried at temperatures below the death point of the rumen organisms. Rumen micro-flora have been dried successfully with full preservation of viability by means of low temperature and high vacuum according to the lyophile process.

(b) In vitro cultures of rumen micro-organisms may be grown under conditions comparable to those obtaining in the rumen of various species of ruminants. The condition for the successful culture of rumen micro-organisms include anerobic conditions such as approximate body temperature of the animals (37° C.–40° C.) and pH in the general range of 6.5 to 7.5, buffered by sodium bicarbonate normally present in the saliva. The freezing point depression of the fluid —.5° C. is maintained by physiological salt solutions which are normal for the rumen contents.

The fresh rumen contents containing the various bacteria, yeast and other rumen flora are fermented with finely ground roughage such as alfalfa, clover hay, young cereal grass, and ground corn or other grains, starch, molasses or other types of sugar. To this are preferably added various natural or synthetic B-complex vitamins which serve as micro-organismal growth and reproduction stimulators with various mineral elements. At suitable intervals as multiplication slows down the material should be centrifuged after which the bacterial and yeast solids and feed residues are removed and dried as indicated above.

The dry culture of the rumen is then fed to the various ruminant animals at any desired rate. Preferably, at least 0.1 pound per 100 pounds body weight per day is suggested to re-establish the normal rumen flora. After normal rumination is started the amount may be reduced as desired but it is contemplated that such cultures be fed in small amounts continuously to maintain a desirable type of flora as indicated hereafter in Example VII. The above culture should be fed with the bacteria and yeast growth stimulating substances as described in Example IV with some form of readily soluble carbohydrate such as molasses.

*Example VII*

By the methods of in vitro cultivation of the bacteria and yeast normally inhabiting the rumen described in Example VI pure cultures of individual organisms may be obtained. The methods of recovering such organisms is known to the art and by cultivating such organisms separately a reblending and mixture may be made to serve as substitutes for the rumen cultures described in the previous example. Typical of a reblended culture is one containing:

(a) Bacteria showing the property of rapid growth and multiplication.

(b) Bacteria capable of digesting maximum amounts of cellulose per unit time.

(c) Bacteria capable of digesting protein most rapidly.

(d) Bacteria which utilize non-protein-nitrogen and build up the largest amounts of bacterial protein.

(e) Bacteria which contain protein of the highest biological value.

(f) Bacteria capable of synthesizing the largest amounts of B-complex vitamins.

(g) Bacteria rich in fat, lecithin, cholesterol, and other lipids.

(h) Bacteria with simple nutritive requirements, such as essential amino acids, growth stimulating factors, lipids and essential minerals. Similarly, the strains of rumen yeast may be cultivated in vitro having the desired characteristics listed above.

The several valuable rumen type bacteria and yeast are dried, blended, and fed as a part of the regular ration so that the preferred types of organisms will inhabit the rumen of the animals so fed and promote to an optimum degree attainment of the results heretofore outlined.

It is contemplated in practicing the invention, as hereinbefore described, that the various additions to the diet of a ruminant animal, as set forth in the examples, may be used alone or in combination. In other words, ruminant micro-flora nutrient and growth stimulating substances of various types, either natural or artificial dried cultures of rumen micro-flora or blended dried cultures of superior strains of rumen bacteria and yeast may be added as a constituent of the diet. The dried cultures would be combined with the growth stimulating substances in small amounts merely to provide a continuing flora of viable organisms of superior growth characteristics.

In general it is desired to provide a synthetic feed based upon the quality of the roughage, which feed shall include certain necessary constituents in predetermined amounts and proportions. Among these constituents are a starchy material in the form of ground grain such as corn or oats, rumen bacteria, yeast, and related rumen micro-flora with synthetic or natural substances having yeast growth stimulating properties, and a non-protein-nitrogen retarded in such fashion that its effect will localize, principally in the rumen.

From the foregoing it will be seen that this invention is one well adapted to attain the ends and objects hereinbefore set forth together with other advantages which are obvious and which are inherent to the supplemental feed.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth is to be interpreted as illustrative and not in a limiting sense.

Having thus described my invention, I claim:

1. A composition for improving the utilization of non-protein-nitrogen and cellulose by ruminant animals comprising coated urea, ground grain, a micro-organismal growth stimulating substance of the class of vitamins of the B-complex, proteins, essential amino acid compounds and cultures of the rumen micro-flora.

2. A pelletized composition as in claim 1 including a binder.

3. A composition comprising a dry culture of the rumen flora of a ruminant animal, a micro-organismal growth stimulating substance of the class consisting of essential amino acids, B-complex vitamins, proteins, bioses and essential minerals, and a carbohydrate.

4. A composition as in claim 3 mixed with ground roughage of the class of hay, alfalfa, cereal grass and grain.

5. A feed supplement for ruminant animals comprising urea and cellulose, said urea coated with a water resistant film to retard the rate of solubility of the urea in the rumen, in combination with a dry culture of the rumen flora of a ruminant animal, a micro-organismal growth stimulating substance of the class consisting of essential amino acids, B-complex vitamins, bioses, and essential minerals, and a carbohydrate.

6. A livestock feed for ruminant animals containing cellulose and urea, said urea coated with a water resistant film to retard the rate of solubility of the urea in the rumen.

7. A livestock feed for ruminant animals containing cellulose and urea, said urea coated with a high melting point fat to retard the rate of solubility of the urea in the rumen.

CHARLES W. TURNER.

REFERENCES CITED

The following references are of record in the file of this patent:

UNITED STATES PATENTS

| Number | Name | Date |
| --- | --- | --- |
| 1,806,290 | Griessbach | May 19, 1931 |
| 2,293,845 | Millar | Aug. 25, 1942 |

FOREIGN PATENTS

| Number | Country | Date |
| --- | --- | --- |
| 22,198 | Great Britain | of 1898 |
| 341,775 | Great Britain | of 1931 |